J. ERIKSON & G. R. WIKANDER.
MITER GAGE.
APPLICATION FILED DEC. 21, 1908.
939,405.
Patented Nov. 9, 1909.
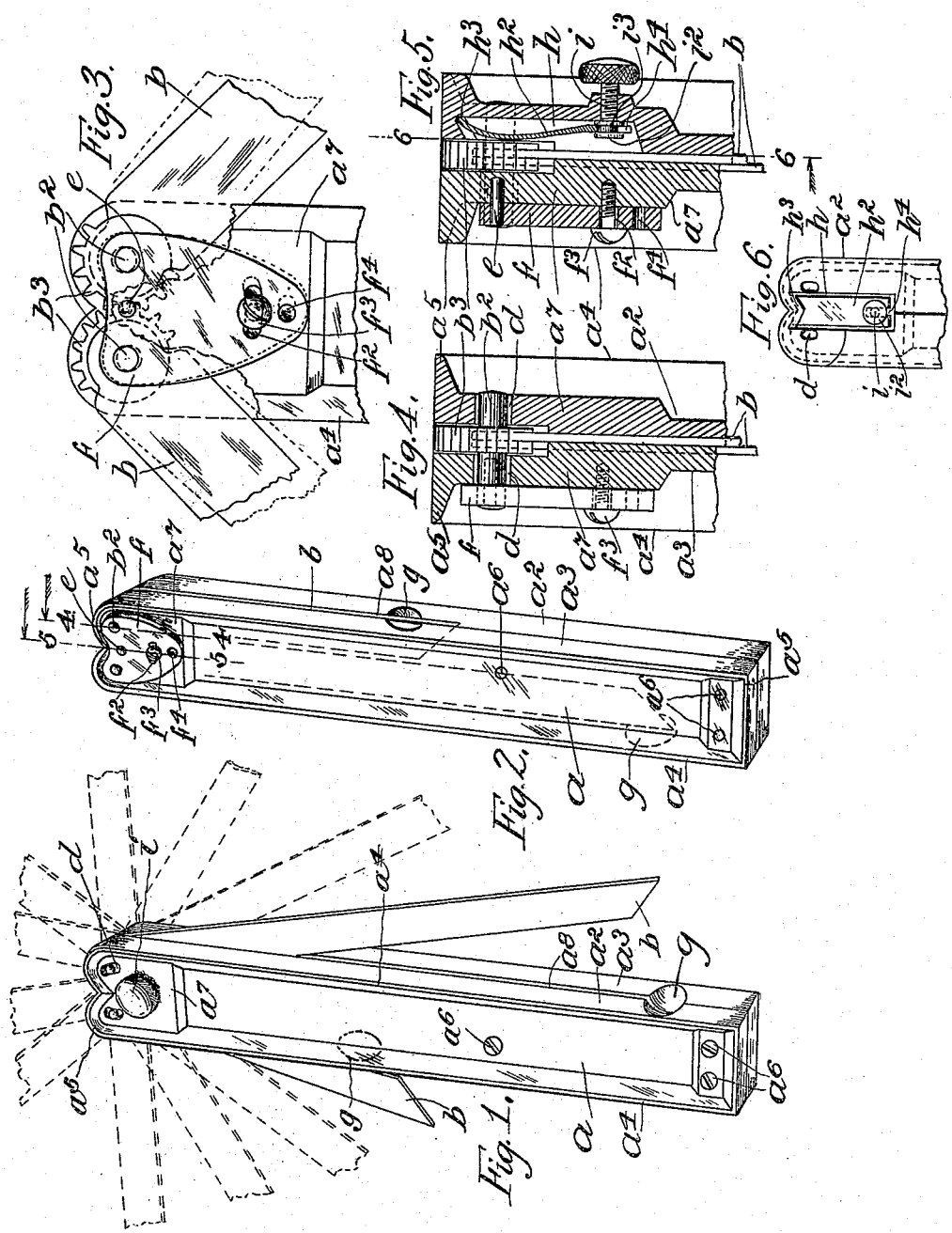
WITNESSES
INVENTORS
John Erikson
and Gustaf R. Wikander
BY
Edgar Tate & Co.
ATTORNEYS.

UNITED STATES PATENT OFFICE.

JOHN ERIKSON AND GUSTAF R. WIKANDER, OF NEW YORK, N. Y.

MITER-GAGE.

939,405.   Specification of Letters Patent.   Patented Nov. 9, 1909.

Application filed December 21, 1908. Serial No. 468,455.

*To all whom it may concern:*

Be it known that we, JOHN ERIKSON and GUSTAF R. WIKANDER, citizens, respectively, of the United States and Sweden, and residing at New York, in the county of New York and State of New York, have invented certain new and useful Improvements in Miter-Gages, of which the following is a specification, such as will enable those skilled in the art to which it appertains to make and use the same.

This invention relates to carpenters' tools and particularly to what are known as miter gages; and the object thereof is to provide an improved device of this class which may be used as an ordinary square, bevel finder, miter gage and for other purposes; and with this object in view the invention consists in a device of the class specified constructed as hereinafter described and claimed.

Our improved tool comprises a handle having two blades or arms pivoted in one end thereof and adapted to be adjusted into a large variety of positions and to be folded into the handle, and the invention is fully disclosed in the following specification, of which the accompanying drawings form a part, in which the separate parts of our improvement are designated by suitable reference characters in each of the views, and in which;—

Figure 1 is a perspective back view of our improved tool and indicating the method of adjusting the blades or arms into different positions; Fig. 2 a perspective front view thereof and showing the blades or arms folded; Fig. 3 a face or front view of the head portion of the tool, with part of the construction broken away and showing the method of adjusting the arms or blades; Fig. 4 a section on the line 4—4 of Fig. 2; Fig. 5 a section on the line 5—5 of Fig. 2; and, Fig. 6 a section on the line 6—6 of Fig. 5.

In the practice of our invention we provide a handle member $a$ composed of separate parts $a^2$ and $a^3$, and said handle member or the separate parts thereof are preferably composed of metal and are also preferably hollowed out longitudinally to form side flanges $a^4$ and end flanges $a^5$, and the said separate parts of the handle are secured together by screws $a^6$ and the central portions of the separate handle members are thickened at one end as shown at $a^7$, and this end of the handle member for the purpose of this description, will be called the head of the handle. We also provide two blade or arm members $b$ which are pivoted in the head of the handle by means of bolts $b^2$, and the separate parts of the handle are provided in their adjacent faces with longitudinal recesses $a^8$ adapted to receive the arms or blades $b$ when folded into the handle, and the said arms or blades are provided at their pivoted ends with gears $b^3$ which are ordinary inter-meshing gears and are directly in mesh at all times, and one or both sides of the handles may be provided with a recess $g$ as shown in Fig. 1, and when the arms or blades $b$ are folded into the handle as shown in Fig. 2, one of said arms or blades may be caught by the thumb and finger and pulled out and adjusted into any desired position, and the other arm or blade will be operated in the same manner and assume a corresponding position.

In the form of construction shown, the holes $d$ in the head portion of the handle and through which the bolts $b^2$ pass are elongated longitudinally of the handle and formed on an arc the center of which is the center of the handle between said bolts and pivoted at said center on a pin or other device $e$ is a flat plate $f$ which ranges longitudinally of the head portion of the handle and is provided with a transverse arc-shaped slot $f^2$ through which is passed a screw $f^3$, and by means of this construction the plate $f$ may be turned on its pivotal support at $e$ and secured in any desired position, and the inner end of the plate $f$ is preferably provided with an aperture $f^4$ into which the end or point of a suitable instrument may be inserted for turning said plate.

The bolts $b^2$ which form the pivots for the arms or blades $b$ pass through and are secured in the plate $f$, and by turning or adjusting the plate $f$ as above described the bolts $b^2$ may also be adjusted in the head end of the handle and this operation will result in adjusting the gears $b^3$ or the position thereof and the movement or operation of the blades or arms $b$ as hereinafter described and claimed. The bolts $b^2$ which form the pivots for the arms or blades $b$ pass through and are secured in the plate $f$ and by turning or adjusting the said plate $f$ as above described the bolts $b^2$ may also be adjusted in the head end of the handle and this operation will result in adjusting the gears $b^3$ or the position thereof as and for the purpose hereinafter described.

A longitudinal recess or chamber $h$ is also formed in one side of the body portion of the handle or the head $a^7$ thereof and a curved plate spring $h^2$ is placed therein. The outer end of this spring bears in the bottom of the recess or chamber $h$ as shown at $h^3$ in Fig. 5, and the bow thereof presses on the gears $b^3$ as clearly shown in said figure and indicated in Fig. 6.

The inner end of the spring $h^2$ is provided with a longitudinal recess $h^4$, and mounted in the part of the handle in which the recess $h$ is formed is a thumb screw $i$, the inner end of which is provided with a head $i^2$ having an annular groove $i^3$ forming a neck, and the recessed end of the spring $h^2$ forms a yoke which fits in said groove and by turning the screw $i$ in one direction the spring $h^2$ will press on the gears $b^3$ and hold the blades or arms $b$ at any desired point of adjustment, and by turning said screw in the opposite direction this pressure will be removed and the blades or arms $b$ may be adjusted into any desired position.

This tool will be found useful in general carpentry and especially useful in laying out angles on boards or strips of molding or other pieces to be used in making miter joints. In using the device for this purpose it is desirable to so adjust the blades or arms that by laying the handle along one edge of the boards or strips of molding the required angle can be laid off on the board or strip of molding by passing a pencil or scratchawl along the edge of each blade in turn and in respect to the part of the joint on which the respective angle is required.

In adjusting the blades to the angle above mentioned, all that is necessary is to support the boards or strips of molding so that their ends will approach one another at the required angle and to hold the tool by the handle and swing the blades outwardly from the handle around their pivots in the head until their edges are brought into coincidence with the edges of the boards or strips of molding and until the angle embraced therebetween is the same as that of the edges of the boards or strips of molding, and as above described the required angles to make the joint between the said boards or strips of molding can be transferred to the material.

This tool will be especially useful in cases where the boards or strips of molding to be mitered together are not of the same width or thickness, in such a case it will be readily understood that the line of the joint, or the line of junction of the two parts of the joint does not bisect the angle embraced between their edges and that a further adjustment of the tool will be necessary if the lines for this joint are to be laid out on the material as above described. This adjustment is provided for in the construction shown, and is effected therein as will be shown later.

In the case in practice above cited it can be readily seen that when the two blades of the tool were brought in coincidence with the edges of the parts to be mitered together, said parts in this case having the same width or thickness that the line of the joint ranges in a direction parallel to the center line of the handle of the tool, but in a case where the two parts to be mitered together are not of the same width or thickness this is not true, and in order to conveniently lay out upon the material the angles required in making the joints it will be necessary to bring the center line of the handle of the tool into parallel relation with the line of the joint. To do this, all that is necessary is to loosen the screw $f^3$, and by firmly holding the blades of the tool in the above stated relation to the sides of the parts to be joined the handle of the tool may be freely moved in a direction necessary to bring its center line into parallel relation with the line of the joint, and the screw $f^3$ may then be tightened to maintain this relation of parts. When this has been done it will be understood that the angle embraced between the blades of the tool and the angle desired between the two parts to be mitered is the same, and that the handle of the tool is parallel to the line of the joint. With the tool set in this way the proper angles can be transferred to the material for this joint, in identically the same way as in the case where the parts to be joined were of the same width, namely by laying the edge of the handle along the edge of the board or strip of molding and passing the scratchawl or pencil along the edge of each blade on each part of the joint in turn respectively.

Having fully described our invention, what we claim as new and desire to secure by Letters Patent, is;—

1. A tool of the class described, comprising a handle provided in its opposite sides with longitudinal recesses, two blades or arms pivoted in the head of said handle and adapted to be folded into said recesses, said blades or arms being provided at the pivotal ends with intermeshing gears whereby the movement of one of said blades or arms will also move the other, an adjustable plate connected with one side of the head of the handle and in which the pivot pins of said arms or blades are secured, said plate being adapted to be moved into different positions so as to adjust the said pivot pins and the said gears with reference to each other.

2. A tool of the class described, comprising a handle provided in its opposite sides with longitudinal recesses, two blades or arms pivoted in the head of said handle and adapted to be folded into said recesses, said blades or arms being provided at their pivotal ends with intermeshing gears whereby the movement of one of said blades or arms will also move the other, an adjustable plate connected with one side of the head of the handle and in which the pivot pins of said arms or blades are secured, said plate being adapted to be moved into different positions so as to adjust the said pivot pins and the said gears with reference to each other, the opposite side of said head of the handle being also provided with a friction device adapted to bear on said gears.

In testimony that we claim the foregoing as our invention we have signed our names in presence of the subscribing witnesses this 19th day of December 1908.

JOHN ERIKSON.
GUSTAF R. WIKANDER.

Witnesses:
A. R. APPLEMAN,
C. E. MULREANY.